H. S. DICKINSON.
WHEELED PLOW, &c.
APPLICATION FILED JAN. 26, 1915.
1,239,090.
Patented Sept. 4, 1917.
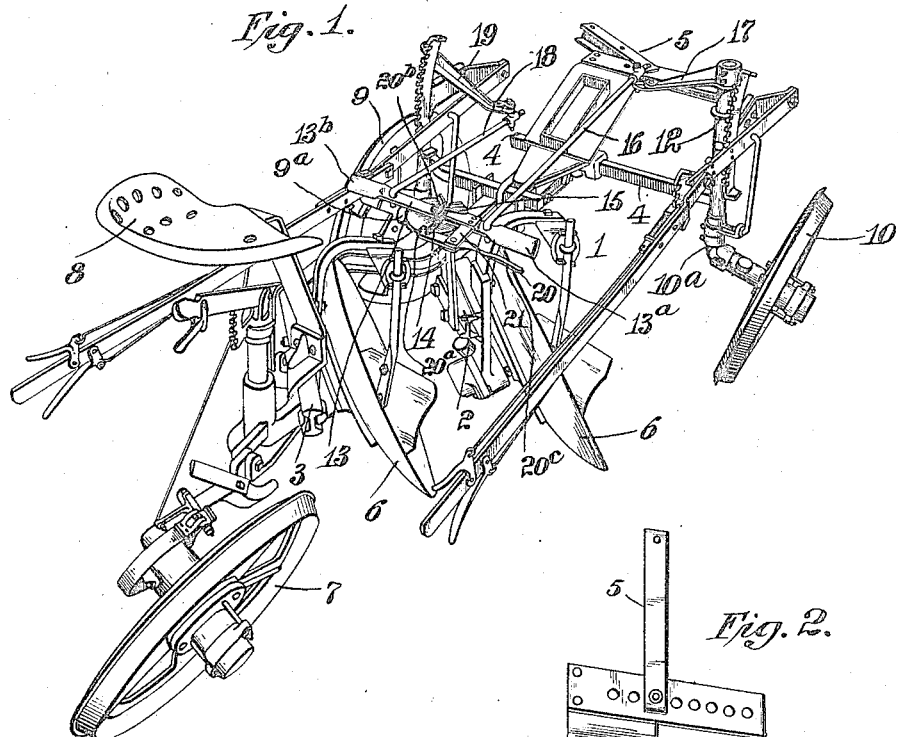
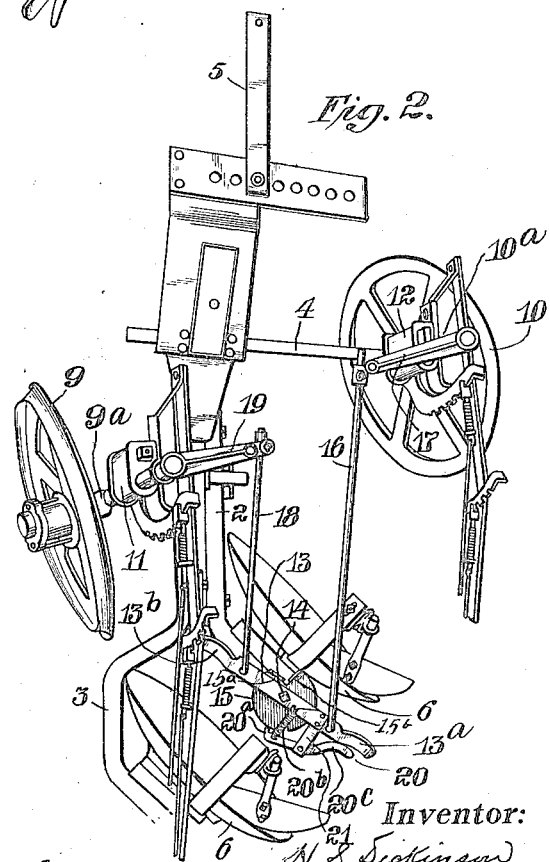
Attest:
C. Mutcher
Fred Forke
Inventor:
H. S. Dickinson
by Rogers, Kennedy & Campbell
Attys.

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

WHEELED PLOW, &c.

1,239,090.  Specification of Letters Patent.  Patented Sept. 4, 1917.

Application filed January 26, 1915. Serial No. 4,433.

*To all whom it may concern:*

Be it known that I, HARRY S. DICKINSON, a citizen of the United States, residing at Moline, in the county of Rock Island and State of Illinois, have invented certain new and useful Improvements in Wheeled Plows, &c., of which the following is a specification, reference being had therein to the accompanying drawing.

This invention relates to agricultural implements, and has reference more particularly to means for guiding the machine in its travel. The invention is designed with special reference to wheel plows employing two guide wheels the turning of which at an angle to the line of draft, will cause the machine to travel in a corresponding direction. In plowing in orchards, it is desirable to plow as closely as possible to the tree trunks, but by reason of the overhanging limbs of the trees it is not possible to approach the tree trunks as closely as desirable without injuring the foliage. The present invention is therefore designed to enable the direction of travel of the plow to be promptly and conveniently changed in order to avoid such obstructions and enable the ground to be plowed close to the tree trunks and when the obstruction is passed the plow may be instantly returned to its former line of travel. My invention is shown in the accompanying drawings, by way of example as applied to a gang plow of the disk type having guide wheels at the forward portion of the frame, respectively on opposite sides, one of the guide wheels serving as a furrow wheel, and the other as a land wheel, and which wheels are mounted so that they may be swung about upright axes to vary their angle relative to the line of draft, but it will be manifest to the skilled mechanic that the invention is applicable to other forms of plows and to other types of agricultural implements, without departing from the limits of my invention; and further it will be understood that the invention is not limited to any particular form or construction of the parts except in so far as such limitations are specified in the claims.

In the accompanying drawings:

Figure 1 is a perspective view looking from the rear of a gang plow, showing my invention applied thereto.

Fig. 2 is a top plan view of the same, with the parts in position to cause the plow to turn to the left or landward.

Referring to the drawings:

1 represents a plow frame comprising two plow beams 2 and 3 fixedly connected together, and having fixedly connected with their forward ends, a transverse frame bar 4 extending in a furrowward direction, the said beams and frame bar constituting in effect a single rigid frame structure, to which the draft is applied by means of a draft device 5 connected to the forward end of said structure. The plow beams in the present instance are equipped with plowing disks 6, and the rear end of the frame is supported by means of a trail wheel 7, over which is situated a driver's seat 8 sustained by the frame. At its forward end the frame is supported by two guide wheels 9 and 10, the guide wheel 9 serving as a land wheel, and the guide wheel 10 serving as a furrow wheel. The guide wheel 9 is mounted on a guide wheel support $9^a$ in the form of a wheel stem having a horizontal arm, on which the wheel is mounted, and having a vertical arm which is journaled in a bearing in a casting or block 11 fixed to the frame at the land side of the same. The guide wheel 10 is likewise mounted on a guide wheel support $10^a$, in the form of a wheel stem having a horizontal arm on which the wheel is mounted, and a vertical arm journaled in a bearing in a block 12 fixed to the outer end of the frame bar 4, the construction being such that the wheel supports are movable about upright axes, in which movements the guide wheels carried by said supports will be likewise swung about upright axes and will incline relatively to the line of draft to the right or left, according to the direction of movement of the supports. 13 represents a horizontal transversely extending foot lever which is pivoted between its ends on an upright axis as at 14, to a supporting plate 15 fixedly connected to the frame of the machine, the outer ends of said foot lever being provided respectively with foot rests $13^a$ and $13^b$. A fore and aft extending operating rod 16 is jointed at its rear end to said foot lever at one side of its axis, and has its forward end jointed to the inner end of an arm 17 which extends outwardly and has its outer end fixedly connected with the upper end of the vertical arm of the guide wheel support 10ª. A fore and aft extending operating rod 18 is jointed at its rear end to said foot lever at the opposite side of the axis of the latter, and has its forward end jointed to the inner end of an arm 19, which extends outwardly and has its upper end fixed to the upper end of the vertical arm of the guide wheel support 9ª. By this construction, the foot lever is operatively connected with the guide wheel supports in such manner that when the lever is rocked on its axis, the guide wheel supports will be rocked on their vertical axes, and the guide wheels carried thereby will be turned relatively to the frame to the right or left according to the direction of movement of the lever. The parts are so constructed and so related that when the foot lever occupies the position shown in Fig. 1 at right angles to the line of draft, the two guide wheels will be maintained parallel with the line of draft and the machine will travel straight forward. If, however, the foot lever is shifted on its axis to the inclined position shown in Fig. 2 with its left hand end forward, the guide wheels will be turned to the left and the machine will be caused to travel to the left; and if the foot lever is shifted to the opposite inclined position with the right hand end forward, the guide wheels will be turned to the right and the machine will travel in a corresponding direction. The foot lever is maintained normally in the position shown in Fig. 1 to insure the travel of the machine straight forward in the line of draft, by means of a foot operated locking latch, in the form of a lever 20 pivoted between its ends to a supporting bracket plate 21 fixed to the foot lever and extending rearwardly therefrom, the inner end of said lever being provided with a nose 20ª adapted to engage in a notch in the rear edge of the supporting plate 15 before alluded to, the position of this notch relative to the nose on the latch being such, that when the parts are interlocked, the foot lever will extend at right angles to the line of draft, and the guide wheels will be maintained straight forward parallel with the line of draft. The latch is acted on by a spring 20ᵇ connected respectively with the inner end of the same and with the foot lever, which spring tends to hold the nose of the latch in engagement with the edge of the supporting plate, so that it will automatically engage in the notch in said plate and lock the foot lever when the latter returns to its right angular position relatively to the line of draft. The outer end of the latch is provided with a foot rest 20ᶜ which extends in rear of and in proximity to the foot rest 13ª of the foot lever, so that the driver will be enabled by his foot to release the latch and operate the foot lever.

In the operation of the machine with the team drawing the same straight forward in the line of draft, the guide wheels will be held locked parallel with the line of draft. In the event of its being desired to quickly deflect or guide the machine for instance to the left to avoid an obstruction, the driver, by pressing with his right foot against the foot rest of the locking latch, will release the foot lever, and then by pushing forwardly with the left foot on the foot rest 13ᵇ the foot lever will be rocked at its axis to the inclined position shown in Fig. 2, the result being that, through the medium of the devices connecting the foot lever with the guide wheel supports, the latter will be rocked on their vertical axes and the guide wheels will both be turned to the left. After the obstruction has been passed, the driver pushes forwardly against the foot rest of the locking latch, which action will rock the foot lever back to its former position and by relieving the pressure in the latch, the latter will be permitted to automatically interlock with the supporting plate and the parts will be locked in their former normal position. If it is desired to guide the machine to the right, the driver releases the locking latch as before, and by continuing the forward pressure on the latch and consequently on the foot lever the latter will be rocked on its axis to the inclined position opposite to that shown in Fig. 2, which action will, as before turn the guide wheels, but in the opposite direction, viz., to the right. When the obstruction has been passed, the driver releases the latch and presses forward with his foot on the foot rest 13ᵇ and the lever will be returned to its former right angular position, and the latch allowed to again interlock with the plate and lock the parts in position.

It is seen therefore that the construction is simple in form, entirely under the convenient control of the driver occupying the driver's seat; and by the operation of the foot lever as described the machine may be caused to promptly turn to the right or left as the case may be, and may be as promptly returned to its former normal position in the line of draft. By reason of the fore and aft extending rods which directly connect the foot lever with the inner ends of the arms on the guide wheel supports, the movements of the foot lever are transmitted directly to said arms, and under the most favorable conditions for effective and prompt action on the guide wheel without the exertion of undue force. It will be observed that the construction is not complicated by independent connections between the guide wheel supports as heretofore employed, the only connection between said supports being through the medium of the foot lever and the fore and aft operating rods, which connections serve the two-fold purpose of positively turning the wheels to the right or left, and of insuring their operation in unison if left free to swivel, as when the locking latch is released.

The foot lever is limited in its movements on the supporting plate 15, by means of two stop shoulders 15$^a$ and 15$^b$ on said plate at the front edge of the same, the stop 15$^a$ being in position to be engaged by the lever when the latter is swung to its extreme position to the left as shown in Fig. 2, and the other stop 15$^b$ being in position to be engaged by the lever when the latter is swung to its opposite extreme. This limitation of the movements of the lever, will by reason of its connection with the swiveling wheel stems, limit the swinging movements of the two wheels.

Having thus described my invention what I claim is:

1. In combination with a frame, guiding wheel supports mounted thereon and movable about upright axes, guide wheels carried by said supports, a plate fixed on the frame and provided in its rear edge with a notch, a horizontal transversely extending foot lever pivoted relatively to the plate and provided with foot rests, connecting means between the foot lever and the respective guide wheel supports adapted by the movements of the foot lever to swing the guide wheel supports about their axes and turn the wheels at angles relatively to the line of draft, and a foot operated locking latch pivoted to the foot lever and formed at its end to ride along the edge of the plate in the swinging movements of the lever, and acting to automatically engage in the notch in the plate when the wheels straighten out in the line of draft.

2. In combination with a frame, guide wheel supports mounted thereon and rockable about upright axes, guide wheels carried by said supports, a supporting plate fixed to the frame and provided at its forward portion with oppositely disposed stop devices, a foot lever pivoted to said supporting plate and operatively connected with the guide wheel supports for rocking the latter, and adapted in its two extreme positions to contact with said stop devices and limit the movements of the lever and the connected parts, and a foot operated locking latch mounted on the foot lever and adapted to releasably interlock the said supporting plate.

In testimony whereof, I have affixed my signature in presence of two witnesses.

HARRY S. DICKINSON.

Witnesses:
L. C. BLANDING,
JAMES J. LAMB.